Dec. 14, 1965    L. H. WHITNEY    3,223,413
DUAL OCCUPANT VELOCIPIDE FOR TUG-OF-WAR CONTESTS
Filed March 6, 1964    2 Sheets-Sheet 1
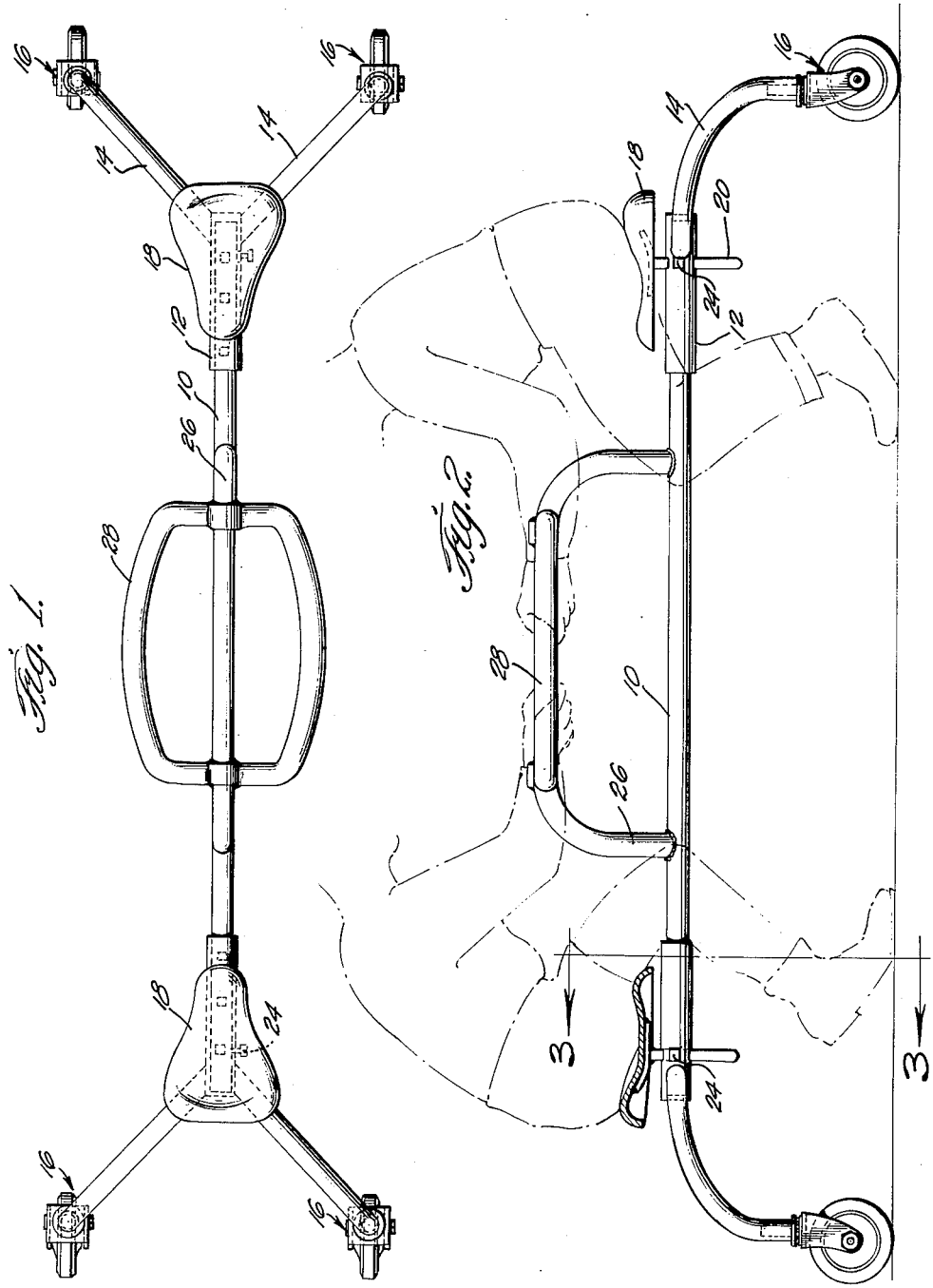
INVENTOR.
LAWRENCE H. WHITNEY
BY
McMorrow, Berman + Davidson
ATTORNEYS Dec. 14, 1965     L. H. WHITNEY     3,223,413
DUAL OCCUPANT VELOCIPIDE FOR TUG-OF-WAR CONTESTS
Filed March 6, 1964     2 Sheets-Sheet 2
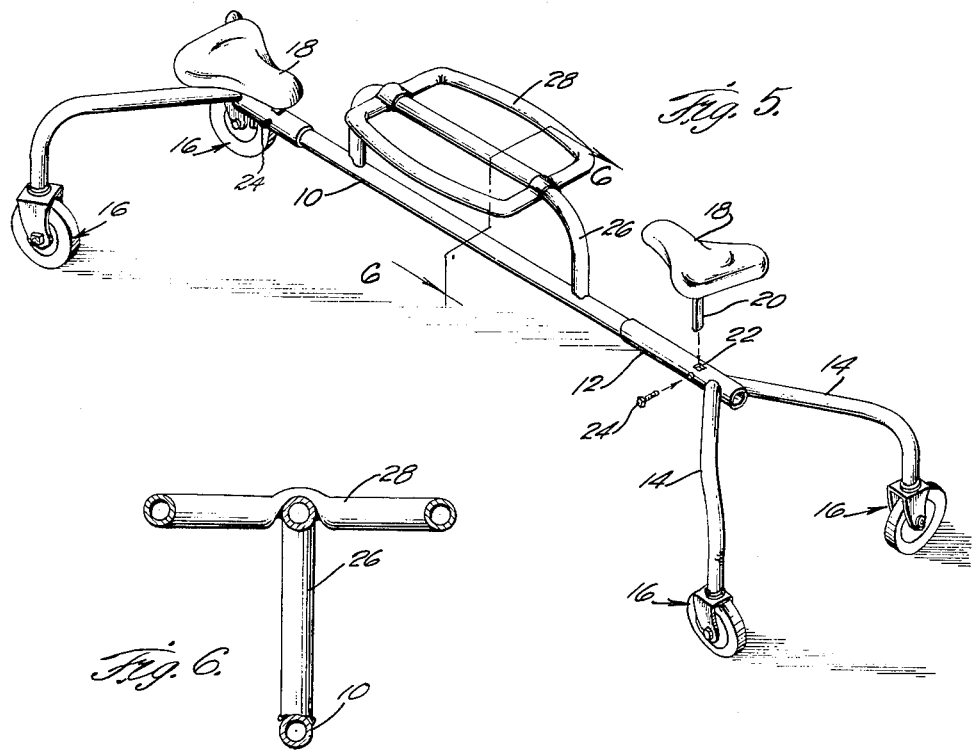
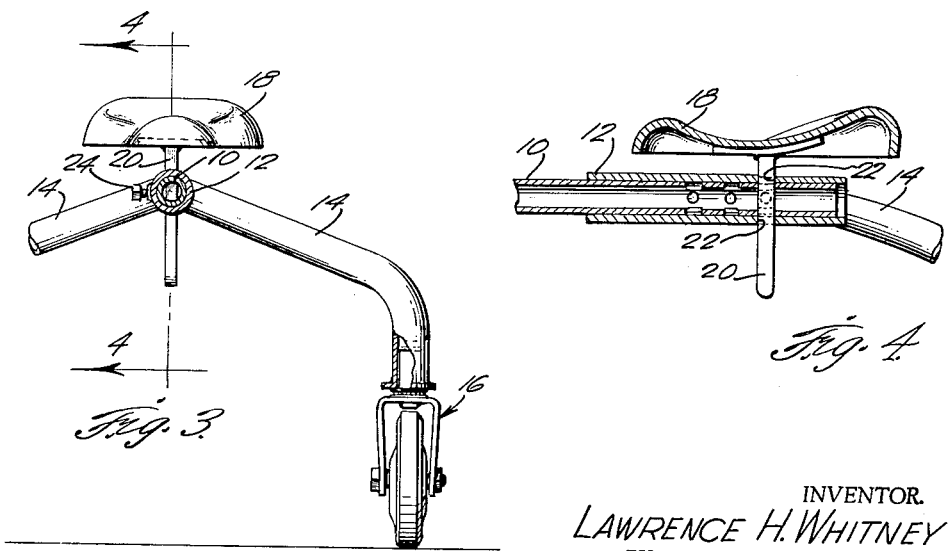
INVENTOR.
LAWRENCE H. WHITNEY
BY
McMorrow, Berman + Davidson
ATTORNEYS

United States Patent Office 3,223,413
Patented Dec. 14, 1965

3,223,413
DUAL OCCUPANT VELOCIPEDE FOR
TUG-OF-WAR CONTESTS
Lawrence H. Whitney, 161 Longwood Place W.,
Detroit, Mich.
Filed Mar. 6, 1964, Ser. No. 349,813
7 Claims. (Cl. 273—1)

This invention relates to toy vehicles, and in particular to a foot-propelled type of vehicle. Vehicles of this general type are exemplified in the well-known "Kiddie-Car."

It is a general object of the present invention to provide a foot-propelled vehicle which will accommodate two riders, and in particular, a rider at each end, and mounted face to face.

In still greater particularity, it is an object to employ caster wheels exclusively, in order to complicate maneuvering and render it more difficult, thus reversing the role of the caster wheel, which is intended normally to favor progress of a vehicle.

Other objects include the provision of a device which is simple of structure, yet durable, easy of manufacture and assembly, and low in cost.

These and other objects, which will be apparent, are attained by the present invention, a preferred form of which is described in the following specification, as illustrated in the drawing, in which:

FIGURE 1 is a top plan view of a dual vehicle, according to the invention,

FIGURE 2 is a side elevational view of the vehicle of FIGURE 1, with a pair of operators indicated in broken lines, FIGURE 3 is a fragmental sectional view, taken on the plane of the line 3—3 of FIGURE 2, and broken away in part, FIGURE 4 is a sectional view taken on the plane of the line 4—4 of FIGURE 3, FIGURE 5 is a perspective view of the vehicle, with one seat shown in exploded form, and FIGURE 6 is a sectional view taken on the plane of the line 6—6 of FIGURE 5.

Referring to the drawings by characters of reference there is shown a frame having a main, central section comprising a tube 10, and a pair of identical, bifurcate, end sections, each having a relatively short section of tube 12, telescopically received on the main tube 10. As seen in FIGURES 1 and 2, the bifurcate portions 14 of an end section, which is welded to tube 12, is Y-form in plan, and curvate in side elevation, after the manner of tricycles. Also, the lower end of each is equipped with a conventional caster wheel 16, preferably rubber-tired.

A pair of inwardly facing seats, or saddles, 18, on the end sections, also provide means to interlock the end sections with the center section. Thus, the square seat post 20 is received in a pair of vertically aligned square holes 22 in tube 12 of each end frame, and central tube 10 has three sets of such holes at each end, for receiving the seat post, and also providing for length adjustment. Height adjustment is attained by vertical movement of seat post 20, the same being held in adjusted position by a set screw 24, received in a suitable, threaded bore in the side of tube 12 of each end frame.

Handlebars for the operators are provided in a framework carried centrally of main tube 10, and comprising a U-form tube 26, with ends welded to tube 10, and a closed-loop element 28, medially flattened and welded to the top of tube 26. One manner in which this grip may be engaged is illustrated in FIGURE 2, which also shows the relative positions of the operators when contending. Generally speaking, the contest amounts to a tug-of-war, with the two players striving to move the vehicle in opposite directions. No set of formal rules is necessary, and the goal may vary in each case. In any event, exercise, recreation and amusement are entailed, and certain skills may be developed. For instance, one party might suddenly cease opposing efforts, thus throwing his opponent off balance, a situation upon which he can quickly capitalize. Also, side movements will result in positioning casters for a quick reversal. In fact, the operation offers much more variety than would be apparent from a mere inspection of the drawing. Obviously, back-pedaling offers opportunity for larger force input.

While a certain, preferred embodiment has been shown and described, various modifications will be apparent, in the light of this disclosure, and the invention should not, therefore, be deemed as limited, except insofar as shall appear from the spirit and scope of the appended claims.

I claim:

1. A toy vehicle for contesting riders comprising a frame including a central tube from which depend a plurality of legs with a pair of legs disposed at each end of said frame, a caster wheel carried by each of said legs, a seat carried at each end of said frame, and said legs being bifurcated and having a portion telescoped on said tube.

2. A device as in claim 1, said portion having vertically-aligned bores, said seats each comprising a saddle having a post received in said bores, and said central tube having a plurality of bores receiving said post, whereby said seat is adjustable in position longitudinally of the frame, and a set screw carried by said central tube and adapted to contact said post.

3. A device as in claim 1, said portion having vertically-aligned bores, said seats each comprising a saddle having a post received in said bores, and said central tube having a plurality of bores receiving said post, whereby said seat is adjustable in position longitudinally of the frame, and a set screw carried by said central tube and adapted to contact said post, said seats being so arranged that the riders face one another.

4. In a device as in claim 3, a hand grip for two riders medially of said tube.

5. A device as defined in claim 4, said grip comprising a closed loop secured on a U-form support.

6. A device as in claim 1, said seats being so arranged that the riders face one another.

7. In a device as in claim 1, a hand grip for two riders medially of said central tube.

References Cited by the Examiner

UNITED STATES PATENTS

| 647,786 | 4/1900 | Anderson | 280—231 |
| 1,380,893 | 6/1921 | Gerbert | 280—222 |

FOREIGN PATENTS

| 2,622 | 1910 | Great Britain. |

LEO FRIAGLIA, *Primary Examiner.*